| | | |
|---|---|---|
| (12) | United States Patent<br>Anshu | (10) Patent No.: US 11,471,828 B1<br>(45) Date of Patent: Oct. 18, 2022 |

(54) GREENHOUSE GAS CONVERTER CHAMBER

(71) Applicant: Tilahun Anshu, Lowell, MA (US)

(72) Inventor: Tilahun Anshu, Lowell, MA (US)

( * ) Notice: Subject to any disclaimer, the term of this patent is extended or adjusted under 35 U.S.C. 154(b) by 511 days.

(21) Appl. No.: 16/459,747

(22) Filed: Jul. 2, 2019

(51) Int. Cl.
| | |
|---|---|
| *B01D 53/14* | (2006.01) |
| *B01D 53/34* | (2006.01) |
| *B01D 53/78* | (2006.01) |
| *B01D 53/75* | (2006.01) |
| *B01D 53/62* | (2006.01) |
| *B01D 53/56* | (2006.01) |

(52) U.S. Cl.
CPC .......... *B01D 53/346* (2013.01); *B01D 53/56* (2013.01); *B01D 53/62* (2013.01); *B01D 53/75* (2013.01); *B01D 53/78* (2013.01)

(58) Field of Classification Search
CPC .... B01D 53/00; B01D 53/14; B01D 53/1475; B01D 53/1456; B01D 53/1425; B01D 53/18; B01D 53/1825; B01D 53/346; B01D 53/56; B01D 53/62; B01D 53/75; B01D 53/78

See application file for complete search history.

(56) References Cited

U.S. PATENT DOCUMENTS

| | | | | |
|---|---|---|---|---|
| 2008/0236114 | A1* | 10/2008 | Zhang .................. | B01D 53/261<br>55/385.1 |
| 2018/0117520 | A1* | 5/2018 | Gonzalez ................ | C02F 1/001 |

* cited by examiner

*Primary Examiner* — Cabrena Holecek
(74) *Attorney, Agent, or Firm* — Kyle A. Fletcher, Esq.

(57) ABSTRACT

The greenhouse gas converter chamber is a process and apparatus that captures, cleans, and separates greenhouse or exhaust gases at their source. Once separated, each individual gas can be released back into the atmosphere or stored depending on the gas's impact on the environment.

19 Claims, 2 Drawing Sheets

GREENHOUSE GAS CONVERTER CHAMBER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physical and chemical processes including gas separation technologies, more specifically, a process for the chemical purification of waste gases. (B01D53/34)

The issue of global warming and how to mitigate this problem has been a major challenge both politically and scientifically. The intention of the current disclosure is to capture the emissions as they are created at their source and to process the emissions into separate gas components. The trapping and processing of emissions has advantages over existing technologies especially in major population centers where pollution can create health problems. Because many greenhouse gases have commercial and industrial applications, additional benefit is achieved by separating these gases out. The greenhouse gas converter chamber is an apparatus that captures greenhouse or exhaust gases at their source. The captured gases are then cleaned and separated. Once separated, each individual gas can be released back into the atmosphere or stored depending on the gas's impact on the environment. The greenhouse gas converter chamber comprises an emission reservoir, a removal complex, a separation complex, and a one or more gas storage chambers.

SUMMARY OF INVENTION

The greenhouse gas converter chamber is a mechanical apparatus configured to remove one or more greenhouse gases from an exhaust gas stream. As shown in FIG. 2, the process strategy employed by the greenhouse gas converter chamber 100 involves: a) capturing 121 the exhaust gases at the emission source 109; b) storing 122 the captured gases; c) removing 123 debris which primarily consists of soot and other particulate matter; d) separating 124 of greenhouse gases from other gases; and, d) sequestering 125 the individual greenhouse gases for permanent storage or alternate use. The capture 121 and storage 122 processes are referred to as the collection processes 126. The removal 123, separation 124 and sequestration 125 processes are referred to as the conversion processes 127. It is envisioned that economic and financial considerations will vary with each implementation. The expectation is that the conversion processes 127 will be more economically feasible when large volume processing is possible. When a large emission source is being processed, it can be economically feasible to co-locate the collection processing 126 and conversion processing 127 with the large emission source. For smaller or mobile emission sources it could be more efficient to separate the collection processes 126 and conversion processes 127 so that the exhaust is captured 121 and stored 122 for later transport to facility dedicated to conversion processing 127.

This disclosure provides the detailed specification of the mechanical apparatus required to create the greenhouse gas converter chamber 100 that implements the above processes. The emission source 109 refers to the source of the exhaust gas 199 that is processed by the invention 100.

These together with additional objects, features and advantages of the greenhouse gas converter chamber will be readily apparent to those of ordinary skill in the art upon reading the following detailed description of the presently preferred, but nonetheless illustrative, embodiments when taken in conjunction with the accompanying drawings.

In this respect, before explaining the current embodiments of the greenhouse gas converter chamber in detail, it is to be understood that the greenhouse gas converter chamber is not limited in its application to the details of construction and arrangements of the components set forth in the following description or illustration. Those skilled in the art will appreciate that the concept of this disclosure may be readily utilized as a basis for the design of other structures, methods, and systems for carrying out the several purposes of the greenhouse gas converter chamber.

It is therefore important that the claims be regarded as including such equivalent construction insofar as they do not depart from the spirit and scope of the greenhouse gas converter chamber. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
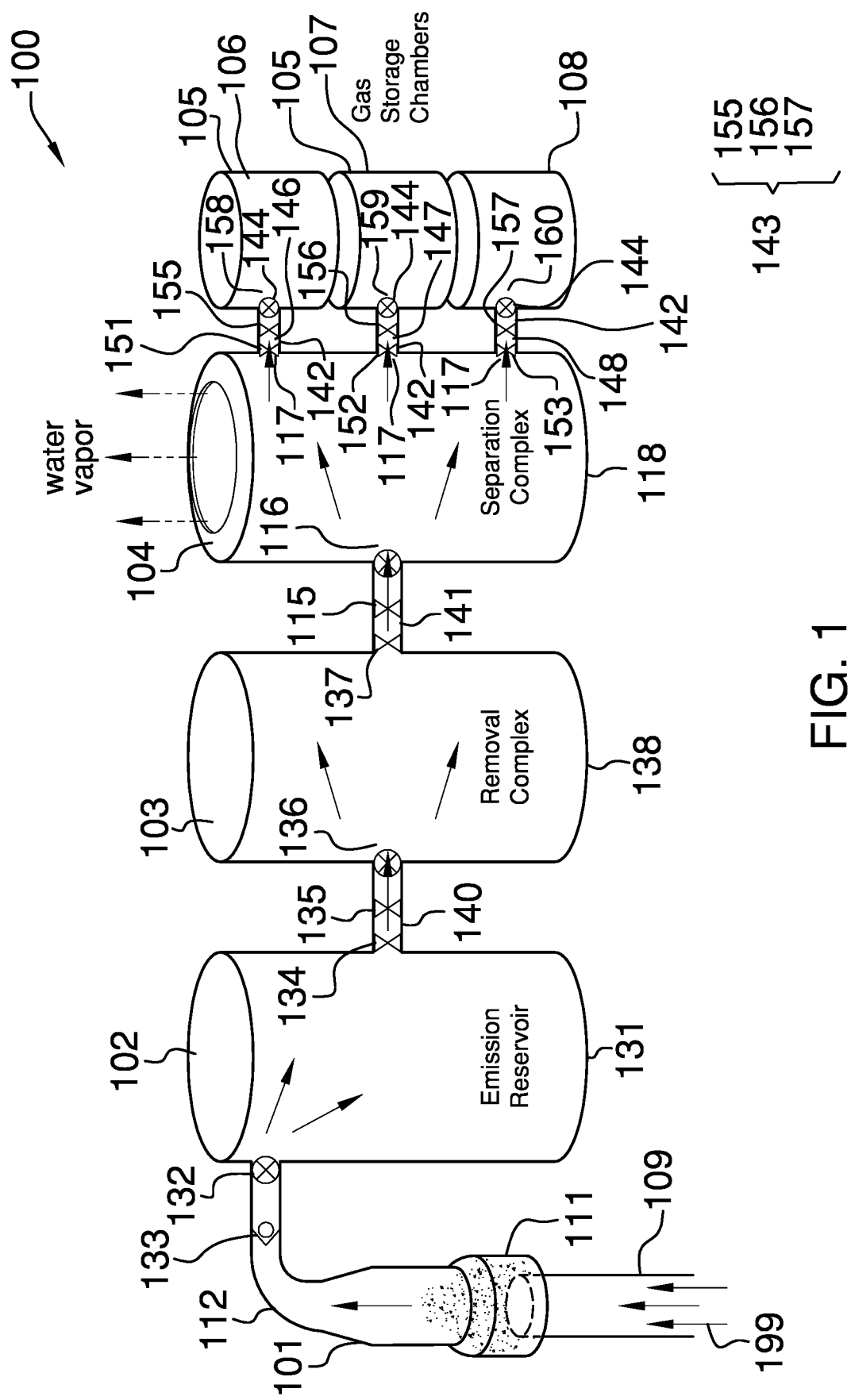
FIG. 1 is a schematic view of an embodiment of the disclosure.
Figure 2:
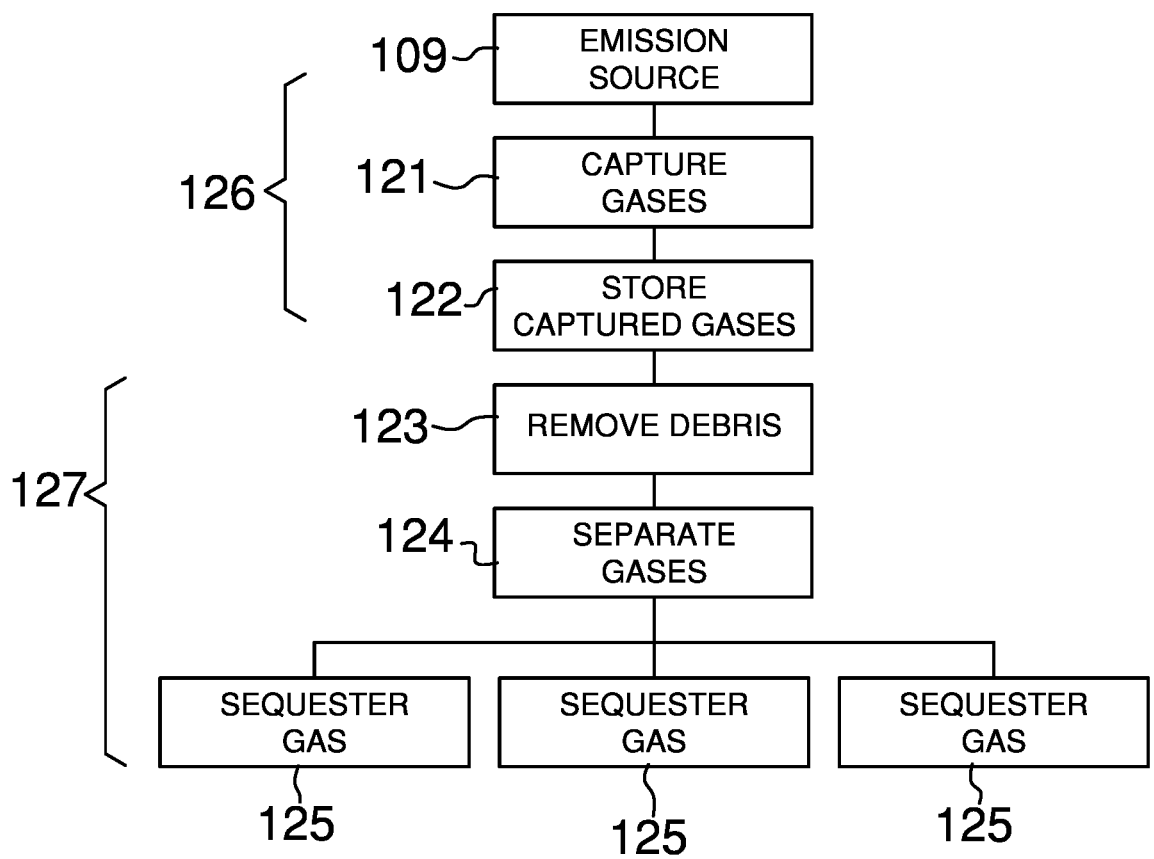
FIG. 2 is a flowchart of an embodiment of the disclosure.

Detailed reference will now be made to one or more potential embodiments of the disclosure, which are illustrated in FIGS. 1 through 2.

The greenhouse gas converter chamber is a mechanical apparatus configured to remove one or more greenhouse gases from an exhaust gas stream. As shown in FIG. 2, the process strategy employed by the greenhouse gas converter chamber 100 involves: a) capturing 121 the exhaust gases at the emission source 109; b) storing 122 the captures gases; c) removing 123 debris which primarily consists of soot and other particulate matter; d) separating 124 of greenhouse gases from other gases; and, d) sequestering 125 the individual greenhouse gases for permanent storage or alternate use. The capture 121 and storage 122 processes are referred to as the collection processes 126. The removal 123, separation 124 and sequestration 125 processes are referred to as the conversion processes 127. It is envisioned that economic and financial considerations will vary with each implementation. The expectation is that the conversion processes 127 will be more economically feasible when large volume processing is possible. When a large emission source 109 is being processed, it can be economically feasible to co-locate the collection processing 126 and conversion processing with the large emission source 109. For smaller or mobile emission sources 109 it could be more efficient to separate the collection processes 126 and conversion processes 127 so that the exhaust is captured 121 and stored 122 for later transport to facility dedicated to conversion processing 127.

This disclosure provides the detailed specification of the mechanical apparatus required to create the greenhouse gas converter chamber 100 that implements the above processes. The emission source 109 refers to the source of the exhaust gas 199 that is processed by the invention 100. The invention 100 consists of an emission trap 101, an emission reservoir 102, a removal complex 103, a separation complex 104, one or more gas storage chambers 105, a removal feed tube 140, a separation feed tube 141, one or more gas storage chamber feed tubes 142, one or more gas storage chamber intake valves 143, and one or more gas storage chamber intake pumps 144.

The emission trap 101 performs the capture 121 function of the invention 100. The emission reservoir 102 performs the storage 122 function of the invention 100. The removal complex 103 performs the debris removal 123 function of the invention 100. The separation complex 104 performs the separation 124 function of the invention 100. The one or more gas storage chambers 105 performs the sequestration 125 function of the invention 100.

The removal feed tube 140 forms a fluidic connection that transports and controls the flow of the exhaust gas 199 between the emission tank 131 and a removal tank 138. The separation feed tube 141 forms a fluidic connection that transports and controls the flow of the exhaust gas 199 between the removal tank 138 and a separation tank 118. Each of the one or more gas storage chamber feed tubes 142 forms a fluidic connection that transports and controls the flow of a separated gas 125 between the separation tank 118 and a gas storage chamber selected from the one or more gas storage chambers 105. The one or more gas storage chamber intake valves 143 controls the flow of a separated gas 125 between the separation tank 118 and a gas storage chamber selected from the one or more gas storage chambers 105. The one or more gas storage chamber intake pumps 144 pumps a separated gas 125 from the separation tank 118 to a gas storage chamber selected from the one or more gas storage chambers 105.

The emission trap 101 consists of a nozzle 111 and an intake tube 112. The emission reservoir 102 consists of an emission tank 131, an emission intake pump 132, an emission check valve 133, and a removal feed valve 134. The removal complex 103 consists of a removal intake valve 135, a removal intake pump 136, a separation feed tube valve 137, and a removal tank 138. The separation complex 104 consists of a separation intake valve 115, a separation feed pump 116, a plurality of storage feed valves 117, and a separation tank 118. The one or more gas storage chambers 105 consists of a first gas chamber 106, a second gas chamber 107, and a third gas chamber 108.

The plurality of storage feed valves 117 consists of a first gas chamber 106 feed tube valve 151, a second gas chamber 107 feed tube valve 152, and a third gas chamber 108 feed tube valve 153.

The one or more gas storage chamber feed tubes 142 consists of a first gas chamber 106 feed tube 146, a second gas chamber 107 feed tube 147, and a third gas chamber 108 feed tube 148.

The one or more gas storage chamber intake valves 143 consists of a first gas chamber 106 intake valve 155, a second gas chamber 107 intake valve 156, and a third gas chamber 108 intake valve 157.

The one or more gas storage chamber intake pumps 144 consists of a first gas chamber 106 intake pump 158, a second gas chamber 107 intake pump 159, and a third gas chamber 108 intake pump 160.

The nozzle 111 attaches to the intake tube 112.

The emission intake pump 132, the emission check valve 133, and the removal feed valve 134 attach to the emission tank 131.

The removal intake valve 135, the removal intake pump 136, and the separation feed tube valve 137 attach to the removal tank 138.

The removal feed tube 140 forms a fluidic connection between the emission tank 131 and the removal tank 138.

The separation feed tube 141 forms a fluidic connection between the removal tank 138 and the separation tank 118.

Each of the one or more gas storage chamber feed tubes 142 forms a fluidic connection between the separation tank 118 and a gas storage chamber selected from the one or more gas storage chambers 105.

Each of the one or more gas storage chamber intake valves 143 attaches to a gas chamber feed tube selected from the one or more gas storage chamber feed tubes 142.

Each of the one or more gas storage chamber intake pumps 144 attaches to a gas chamber feed tube selected from the one or more gas storage chamber feed tubes 142.

The emission trap 101 is a structure that captures the exhaust gas 199 of a process. The emission trap 101 transports the captured exhaust gas 199 to the emission reservoir 102. This disclosure assumes that the exhaust gas 199 is generated by a combustion process. Those skilled in the art will recognize that the invention 100 is readily adaptable to an exhaust gas 199 generated by a process that does not require combustion.

The nozzle 111 is a port. The nozzle 111 forms a fluidic connection with the emission source 109 such that the emission source 109 transports the exhaust gas 199 into the nozzle 111. The intake tube 112 is a pipe structure. The intake tube 112 transports the received exhaust gas 199 from the nozzle 111 into the emission reservoir 102.

The emission reservoir 102 is a storage apparatus. The emission reservoir 102 stores the exhaust gas 199 collected by the emission trap 101 until the removal complex 103 can process the stored exhaust gas 199.

The emission tank 131 is a high pressure gas tank that stores the exhaust gas 199 in preparation for processing by the removal complex 103.

The emission intake pump 132 is a mechanical device that generates a pressure differential which is used for transporting the exhaust gas 199 from the intake tube 112 of the emission trap 101 into the emission tank 131. The use of a pump for this purpose is well-known and documented in the mechanical and chemical arts.

The emission check valve 133 is a check valve. In the first potential embodiment of the disclosure, the emission check valve 133 is a ball valve. The emission check valve 133 prevents the backflow of the exhaust gas 199 from the emission reservoir 102 into the emission trap 101. The emission check valve 133 is positioned between the intake tube 112 and the emission intake pump 132.

The removal feed valve 134 is a valve. The removal feed valve 134 controls the flow of the exhaust gas 199 from the emission reservoir 102 into the removal feed tube 140. The removal feed valve 134 allows the flow of gas from the emission reservoir 102 into the removal feed tube 140 when the removal feed valve 134 is in an open position. The removal feed valve 134 inhibits the flow of gas from the emission reservoir 102 into the removal feed tube 140 when the removal feed valve 134 is in a closed position. The removal feed valve 134 installs in the end of the removal feed tube 140 that receives the exhaust gas 199 from the emission reservoir 102.

The removal complex 103 is a mechanical structure. The removal complex 103 receives the exhaust gas 199 from the emission reservoir 102 and processes the exhaust gas 199 to remove debris from the emission reservoir 102. In the first potential embodiment of the disclosure, the removal complex 103 uses a gravity driven settling process to remove the debris. Other appropriate scenarios would include, but are not limited to, gas filtration and gas scrubbing technologies.

The removal tank 138 is a high pressure gas tank that stores the exhaust gas 199 in preparation for processing by the separation complex 104.

The removal intake valve 135 is a valve. The removal intake valve 135 controls the flow of the exhaust gas 199 flowing through the removal feed tube 140 into the removal intake pump 136. The removal intake valve 135 allows the flow of gas through the removal feed tube 140 into the removal intake pump 136 when the removal intake valve 135 is in an open position. The removal intake valve 135 inhibits the flow of gas through the removal feed tube 140 into the removal intake pump 136 when the removal intake valve 135 is in a closed position. The removal intake valve 135 installs in the removal feed tube 140 at a position between the removal feed valve 134 and the removal intake pump 136.

The removal intake pump 136 is a mechanical device that generates a pressure differential which is used for transporting the exhaust gas 199 from the emission reservoir 102 into the removal complex 103 through the removal feed tube 140. The use of a pump for this purpose is well-known and documented in the mechanical and chemical arts.

The separation feed tube valve 137 is a valve. The separation feed tube valve 137 controls the flow of the exhaust gas 199 from the removal complex 103 into the separation feed tube 141. The separation feed tube valve 137 allows the flow of gas from the removal complex 103 into the separation feed tube 141 when the separation feed tube valve 137 is in an open position. The separation feed tube valve 137 inhibits the flow of gas from the removal complex 103 into the separation feed tube 141 when the separation feed tube valve 137 is in a closed position. The separation feed tube valve 137 installs in the end of the separation feed tube 141 that receives the exhaust gas 199 from the removal complex 103.

The separation complex 104 is a mechanical structure that separates the exhaust gas 199 into its constituent gases. The separation complex 104 removes nitrogen and oxygen from the exhaust gas 199 and releases the nitrogen and oxygen into the atmosphere. The separation complex 104 further separates the gas remaining after the separation of the nitrogen and oxygen as greenhouse gases and individually transfers each separated greenhouse gases into a gas storage chamber selected from the one or more gas storage chambers 105. Methods to separate a gas mixture into constituent components are well-known and document in the chemical arts. These methods include, but are not limited to, adsorption techniques, cryogenic distillation techniques, membrane separation techniques, or sorbent tube techniques.

The separation tank 118 is a high pressure gas tank that contains the exhaust gas 199 during processing. The separation intake valve 115 is a valve. The separation intake valve 115 controls the flow of the exhaust gas 199 from the removal complex 103 into the separation complex 104. The separation intake valve 115 allows the flow of gas from the removal complex 103 into the separation complex 104 when the separation intake valve 115 is in an open position. The separation intake valve 115 inhibits the flow of gas from the removal complex 103 into the separation complex 104 when the separation intake valve 115 is in a closed position. The separation intake valve 115 installs in the separation feed tube 141 at a position between the separation feed tube valve 137 and the separation feed pump 116.

The separation feed pump 116 is a mechanical device that generates a pressure differential which is used for transporting a separated greenhouse gas from the removal complex 103 to the separation complex 104. The use of a pump for this purpose is well-known and documented in the mechanical and chemical arts.

Each of the plurality of storage feed valves 117 is a valve. Each of the plurality of storage feed valves 117 controls the flow of the separated greenhouse gases from the separation complex 104 into a gas storage chamber selected from the one or more gas storage chambers 105. Each of the plurality of storage feed valves 117 allows the flow of gas from the separation complex 104 into the selected gas storage chamber when the storage feed valve selected from the plurality of storage feed valves 117 is in an open position. Each of the plurality of storage feed valves 117 inhibits the flow of gas from the separation complex 104 into the selected gas storage chamber when the storage feed valve selected from the plurality of storage feed valves 117 is in a closed position.

Each of the one or more gas storage chambers 105 is a storage apparatus. Each of the one or more gas storage chambers 105 stores a greenhouse gas that has been separated by the separation complex 104.

The first gas chamber 106 is a gas storage chamber selected from the one or more gas storage chambers 105. The first gas chamber 106 stores a first greenhouse gas separated by the separation complex 104. The second gas chamber 107 is a gas storage chamber selected from the one or more gas storage chambers 105. The second gas chamber 107 stores a second greenhouse gas separated by the separation complex 104. The third gas chamber 108 is a gas storage chamber selected from the one or more gas storage chambers 105. The third gas chamber 108 stores a third greenhouse gas separated by the separation complex 104.

The removal feed tube 140 is a pipe. The removal feed tube 140 forms a fluidic connection between the emission tank 131 of the emission reservoir 102 and the removal tank 138 of the removal complex 103.

The separation feed tube 141 is a pipe. The separation feed tube 141 forms a fluidic connection between the removal tank 138 of the removal complex 103 and the separation tank 118 of the separation complex 104.

Each of the one or more gas storage chamber feed tubes 142 is a pipe. Each of the one or more gas storage chamber feed tubes 142 forms a fluidic connection between the separation tank 118 of the separation complex 104 and a gas storage chamber selected from the one or more gas storage chambers 105.

The first gas chamber 106 feed tube 146 is a pipe. The first gas chamber 106 feed tube 146 forms a fluidic connection between the separation tank 118 and the first gas chamber 106 of the one or more gas storage chambers 105. The second gas chamber 107 feed tube 147 is a pipe. The second gas chamber 107 feed tube 147 forms a fluidic connection between the separation tank 118 and the second gas chamber 107 of the one or more gas storage chambers 105. The third gas chamber 108 feed tube 148 is a pipe. The third gas chamber 108 feed tube 148 forms a fluidic connection between the separation tank 118 and the third gas chamber 108 of the one or more gas storage chambers 105.

The first gas chamber 106 feed tube valve 151 is a valve that controls the flow of a separated greenhouse gas from the separation tank 118 into the first gas chamber 106 feed tube 146. The second gas chamber 107 feed tube valve 152 is a valve that controls the flow of a separated greenhouse gas from the separation tank 118 into the second gas chamber 107 feed tube 147. The third gas chamber 108 feed tube valve 153 is a valve that controls the flow of a separated greenhouse gas from the separation tank 118 into the third gas chamber 108 feed tube 148.

Each of the one or more gas storage chamber intake valves 143 is a valve. Each of the one or more gas storage chamber intake valves 143 controls the flow of a separated greenhouse gas from the separation tank 118 into a feed tube selected from the one or more gas storage chamber feed tubes 142.

Each of the one or more gas storage chamber intake valves 143 allows the flow of gas through a feed tube selected from the one or more gas storage chamber feed tubes 142 into an intake pump selected from the one or more gas storage chamber intake pumps 144 when the appropriate intake valve selected from the one or more gas storage chamber intake valves 143 is in an open position. Each of the one or more gas storage chamber intake valves 143 inhibits the flow of gas through the one or more gas storage chamber feed tubes 142 into the one or more gas storage chamber intake pumps 144 when the appropriate intake valve selected from the one or more gas storage chamber intake valves 143 is in a closed position. Each of the one or more gas storage chamber intake valves 143 installs in the removal feed tube 140 at a position between the appropriate feed valve selected from the plurality of storage feed valves 117 and the removal intake pump 136.

The first gas chamber 106 intake valve 155 is a valve that controls the flow of a separated greenhouse gas from the first gas chamber 106 feed tube valve 151 into the first gas chamber 106 intake pump 158. The second gas chamber 107 intake valve 156 is a valve that controls the flow of a separated greenhouse gas from the first gas chamber 106 feed tube valve 151 into the second gas chamber 107 intake pump 159. The third gas chamber 108 intake valve 157 is a valve that controls the flow of a separated greenhouse gas from the third gas chamber 108 feed tube valve 153 into the third gas chamber 108 intake pump 160.

Each of the one or more gas storage chamber intake pumps 144 is a mechanical device that generates a pressure differential which is used for transporting a separated greenhouse gas from the appropriate intake valve selected from the one or more gas storage chamber intake valves 143 into the appropriate gas storage chamber selected from the one or more gas storage chambers 105 through the appropriate feed tube selected from the one or more gas storage chamber feed tubes 142. The use of a pump for this purpose is well-known and documented in the mechanical and chemical arts.

The first gas chamber 106 intake pump 158 is a mechanical device that generates a pressure differential which is used for transporting a separated greenhouse gas from the first gas chamber 106 intake valve 155 into the first gas chamber 106 through the first gas chamber 106 feed tube valve 151. The use of a pump for this purpose is well-known and documented in the mechanical and chemical arts.

The second gas chamber 107 intake pump 159 is a mechanical device that generates a pressure differential which is used for transporting a separated greenhouse gas from the second gas chamber 107 intake valve 156 into the second gas chamber 107 through the second gas chamber 107 feed tube valve 152. The use of a pump for this purpose is well-known and documented in the mechanical and chemical arts.

The third gas chamber 108 intake pump 160 is a mechanical device that generates a pressure differential which is used for transporting a separated greenhouse gas from the third gas chamber 108 intake valve 157 into the third gas chamber 108 through the third gas chamber 108 feed tube valve 153. The use of a pump for this purpose is well-known and documented in the mechanical and chemical arts.

The following definitions were used in this disclosure:

Atmosphere: As used in this disclosure, the atmosphere refers to a blanket of gases (primarily nitrogen and oxygen) that surround the earth. Typical atmospheric conditions are approximated and characterized as the normal temperature and pressure. Atmospheric gases are commonly called air.

Ball Valve: As used in this disclosure, a ball valve is a type of commercially available check valve.

Check Valve: As used in this disclosure, a check valve is a valve that permits the flow of fluid in a single direction. Within selected potential embodiments of this disclosure, the check valve is a commercially available product that is selected from the group consisting of a ball valve and a Tesla valve.

Closed Position: As used in this disclosure, a closed position refers to a movable barrier structure that is in an orientation that prevents passage through a port or an aperture. The closed position is often referred to as an object being "closed." Always use orientation.

Combustion: As used in this disclosure, combustion refers to a reduction-oxidation reaction wherein oxygen and a hydrocarbon are combined to release energy, carbon dioxide, and water. In general usage, the meaning of combustion is often extended to describe a reaction between oxygen and a fuel source, such as a hydrocarbon modified by functional groups, which releases energy.

Debris: As used in this disclosure, debris refers to an accumulation of loose and unwanted material that is contained within a gas flow.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Gas: As used in this disclosure, a gas refers to a state (phase) of matter that is fluid and that fills the volume of the structure that contains it. Stated differently, the volume of a gas always equals the volume of its container.

Greenhouse Gas: As used in this disclosure, a greenhouse gas refers to a molecule in a gas phase that absorbs infrared radiation.

High Pressure Gas Tank: As used in this disclosure, a high pressure gas tank is a container that is used to store compressed gas.

Liquid: As used in this disclosure, a liquid refers to a state (phase) of matter that is fluid and that maintains, for a given pressure, a fixed volume that is independent of the volume of the container.

Nozzle: As used in this disclosure, a nozzle is a device that receives fluid under pressure and releases the fluid in a controlled manner into a structure or an environment.

Open Position: As used in this disclosure, an open position refers to a movable barrier structure that is in an orientation that allows passage through a port or an aperture. The open position is often referred to as an object being "open."

Orientation: As used in this disclosure, orientation refers to the positioning of a first object relative to: 1) a second object; or, 2) a fixed position, location, or direction.

Pipe: As used in this disclosure, a pipe is a hollow prism-shaped device that is suitable for use in transporting a fluid. The line that connects the center of the first base of the prism to the center of the second base of the prism is referred to as the axis of the prism or the centerline of the pipe. When two pipes share the same centerline they are said to be aligned. In this disclosure, the terms inner dimension of a pipe and outer dimension are used as they would be used by those skilled in the plumbing arts. Within this disclosure, a tube is a synonym for a pipe. Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Port: As used in this disclosure, a port is an opening formed in an object that allows fluid to flow through the boundary of the object.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reduction-Oxidation Reaction: As used in this disclosure, a reduction-oxidation reaction (also known as a redox reaction) is a chemical reaction involving the transfer of electrons between the reactants of the reaction.

Reservoir: As used in this disclosure, a reservoir refers to a container or containment system that is configured to store a fluid.

Tank: As used in this disclosure, a tank is an enclosed hollow structure used to store a fluid.

Valve: As used in this disclosure, a valve is a device that is used to control the flow of a fluid (gas or liquid) through a pipe, tube, or hose.

With respect to the above description, it is to be realized that the optimum dimensional relationship for the various components of the invention described above and in FIGS. 1 through 2 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An apparatus for capturing and processing exhaust gases consisting of
   an emission trap, an emission reservoir, a removal complex, a separation complex, one or more gas storage chambers, a removal feed tube, a separation feed tube, one or more gas storage chamber feed tubes, one or more gas storage chamber intake valves, and one or more gas storage chamber intake pumps;
   wherein the removal feed tube forms a connection that transports and controls the flow of an exhaust gas between an emission tank and a removal tank;
   wherein the separation feed tube forms a fluidic connection that transports and controls the flow of the exhaust gas between the removal tank and a separation tank;
   wherein each of the one or more gas storage chamber feed tubes forms a fluidic connection that transports and controls the flow of a separated gas between the separation tank and a gas storage chamber selected from the one or more gas storage chambers;
   wherein the one or more gas storage chamber intake valves control the flow of the separated gas between the separation tank and the gas storage chamber selected from the one or more gas storage chambers;
   wherein the one or more gas storage chamber intake pumps pump the separated gas from the separation tank to the gas storage chamber selected from the one or more gas storage chambers;
   wherein the separation complex is a mechanical structure that separates the exhaust gas into constituent gases;
   wherein the separation complex removes nitrogen and oxygen from the exhaust gas and releases the nitrogen and oxygen into the atmosphere;
   wherein the separation complex further separates the exhaust gas remaining after the separation of the nitrogen and oxygen as greenhouse gases and individually transfers each separated greenhouse gases into the gas storage chamber selected from the one or more gas storage chambers.

2. The apparatus for capturing and processing exhaust gases according to claim 1,
wherein the emission trap consists of a nozzle and an intake tube;
wherein the emission reservoir consists of the emission tank, an emission intake pump, an emission check valve, and a removal feed valve;
wherein the removal complex consists of a removal intake valve, a removal intake pump, a separation feed tube valve, and the removal tank;
wherein the separation complex consists of a separation intake valve, a separation feed pump, a plurality of storage feed valves, and the separation tank;
wherein the one or more gas storage chambers consists of a first gas chamber, a second gas chamber, and a third gas chamber;
wherein the plurality of storage feed valves consists of a first gas chamber feed tube valve, a second gas chamber feed tube valve, and a third gas chamber feed tube valve;
wherein the one or more gas storage chamber feed tubes consists of a first gas chamber feed tube, a second gas chamber feed tube, and a third gas chamber feed tube;
wherein the one or more gas storage chamber intake valves consists of a first gas chamber intake valve, a second gas chamber intake valve, and a third gas chamber intake valve;
wherein the one or more gas storage chamber intake pumps consists of a first gas chamber intake pump, a second gas chamber intake pump, and a third gas chamber intake pump;
wherein the nozzle attaches to the intake tube;
wherein the emission intake pump, the emission check valve, and the removal feed valve attach to the emission tank;
wherein the removal intake valve, the removal intake pump, and the separation feed tube valve attach to the removal tank;
wherein each of the one or more gas storage chamber intake valves attaches to a gas chamber feed tube selected from the one or more gas storage chamber feed tubes;
wherein each of the one or more gas storage chamber intake pumps attaches to the gas chamber feed tube selected from the one or more gas storage chamber feed tubes.

3. The apparatus for capturing and processing exhaust gases according to claim 2,
wherein the emission trap is a structure that captures the exhaust gas of a process;
wherein the emission trap transports a captured exhaust gas to the emission reservoir.

4. The apparatus for capturing and processing exhaust gases according to claim 3,
wherein each of the plurality of storage feed valves is a valve; wherein each of the plurality of storage feed valves controls the flow of the separated greenhouse gases from the separation complex into the gas storage chamber selected from the one or more gas storage chambers;
wherein each of the plurality of storage feed valves allows the flow of gas from the separation complex into the selected gas storage chamber when the storage feed valve selected from the plurality of storage feed valves is in an open position;
wherein each of the plurality of storage feed valves inhibits the flow of gas from the separation complex into the selected gas storage chamber when the storage feed valve selected from the plurality of storage feed valves Is in a closed position.

5. The apparatus for capturing and processing exhaust gases according to claim 4,
wherein each of the one or more gas storage chambers is a storage apparatus;
wherein each of the one or more gas storage chambers stores a greenhouse gas that has been separated by the separation complex.

6. The apparatus for capturing and processing exhaust gases according to claim 5,
wherein the removal feed tube is a pipe;
wherein the removal feed tube forms a fluidic connection between the emission tank of the emission reservoir and the removal tank of the removal complex.

7. The apparatus for capturing and processing exhaust gases according to claim 6,
wherein the separation feed tube is a pipe.

8. The apparatus for capturing and processing exhaust gases according to claim 7,
wherein each of the one or more gas storage chamber feed tubes is a pipe.

9. The apparatus for capturing and processing exhaust gases according to claim 8,
wherein each of the one or more gas storage chamber intake valves is a valve;
wherein each of the one or more gas storage chamber intake valves controls the flow of the separated greenhouse gas from the separation tank into a feed tube selected from the one or more gas storage chamber feed tubes;
wherein each of the one or more gas storage chamber intake valves allows the flow of gas through a feed tube selected from the one or more gas storage chamber feed tubes into an intake pump selected from the one or more gas storage chamber intake pumps when the appropriate intake valve selected from the one or more gas storage chamber intake valves is in an open position;
wherein each of the one or more gas storage chamber intake valves inhibits the flow of gas through the one or more gas storage chamber feed tubes into the one or more gas storage chamber intake pumps when the appropriate intake valve selected from the one or more gas storage chamber intake valves is in a closed position;
wherein each of the one or more gas storage chamber intake valves installs in the removal feed tube at a position between the appropriate feed valve selected from the plurality of storage feed valves and the removal intake pump.

10. The apparatus for capturing and processing exhaust gases according to claim 9,
wherein each of the one or more gas storage chamber intake pumps is a mechanical device that generates a pressure differential which is used for transporting the separated greenhouse gas from the appropriate intake valve selected from the one or more gas storage chamber intake valves into the appropriate gas storage chamber selected from the one or more gas storage chambers through the appropriate feed tube selected from the one or more gas storage chamber feed tubes.

11. The apparatus for capturing and processing exhaust gases according to claim 10,
wherein the nozzle is a port;
wherein the nozzle forms a fluidic connection with the emission source such that the emission source transports the exhaust gas into the nozzle;
wherein the intake tube is a pipe structure;
wherein the intake tube transports a received exhaust gas from the nozzle into the emission reservoir.

12. The apparatus for capturing and processing exhaust gases according to claim 11,
wherein the emission tank is a high pressure gas tank that stores the exhaust gas in preparation for processing by the removal complex;
wherein the emission intake pump is a mechanical device that generates a pressure differential which is used for transporting the exhaust gas from the intake tube of the emission trap into the emission tank;
wherein the emission check valve is a check valve;
wherein the emission check valve is positioned between the intake tube and the emission intake pump;
wherein the removal feed valve is a valve;
wherein the removal feed valve controls the flow of the exhaust gas from the emission reservoir into the removal feed tube;
wherein the removal feed valve allows the flow of gas from the emission reservoir into the removal feed tube when the removal feed valve is in an open position;
wherein the removal feed valve inhibits the flow of gas from the emission reservoir into the removal feed tube when the removal feed valve is in a closed position;
wherein the removal feed valve installs in the end of the removal feed tube that receives the exhaust gas from the emission reservoir.

13. The apparatus for capturing and processing exhaust gases according to claim 12,
wherein the removal tank is a high pressure gas tank that stores the exhaust gas in preparation for processing by the separation complex;
wherein the removal intake valve is a valve;
wherein the removal intake valve controls the flow of the exhaust gas flowing through the removal feed tube into the removal intake pump;
wherein the removal intake valve allows the flow of gas through the removal feed tube into the removal intake pump when the removal intake valve is in an open position;
wherein the removal intake valve inhibits the flow of gas through the removal feed tube into the removal intake pump when the removal intake valve is in a closed position;
wherein the removal intake valve installs in the removal feed tube at a position between the removal feed valve and the removal intake pump;
wherein the removal intake pump is a mechanical device that generates a pressure differential which is used for transporting the exhaust gas from the emission reservoir into the removal complex through the removal feed tube;
wherein the separation feed tube valve is a valve;
wherein the separation feed tube valve controls the flow of the exhaust gas from the removal complex into the separation feed tube;
wherein the separation feed tube valve allows the flow of gas from the removal complex into the separation feed tube when the separation feed tube valve is in an open position;
wherein the separation feed tube valve inhibits the flow of gas from the removal complex into the separation feed tube when the separation feed tube valve is in a closed position;
wherein the separation feed tube valve installs in the end of the separation feed tube that receives the exhaust gas from the removal complex.

14. The apparatus for capturing and processing exhaust gases according to claim 13,
wherein the separation tank is a high pressure gas tank that contains the exhaust gas during processing;
wherein the separation intake valve is a valve;
wherein the separation intake valve controls the flow of the exhaust gas from the removal complex into the separation complex;
wherein the separation intake valve allows the flow of gas from the removal complex into the separation complex when the separation intake valve is in an open position;
wherein the separation intake valve inhibits the flow of gas from the removal complex into the separation complex when the separation intake valve is in a closed position;
wherein the separation intake valve installs in the separation feed tube at a position between the separation feed tube valve and the separation feed pump;
wherein the separation feed pump is a mechanical device that generates a pressure differential which is used for transporting the separated greenhouse gas from the removal complex to the separation complex.

15. The apparatus for capturing and processing exhaust gases according to claim 14,
wherein the first gas chamber is the gas storage chamber selected from the one or more gas storage chambers;
wherein the first gas chamber stores a first greenhouse gas separated by the separation complex;
wherein the second gas chamber is the gas storage chamber selected from the one or more gas storage chambers;
wherein the second gas chamber stores a second greenhouse gas separated by the separation complex;
wherein the third gas chamber is the gas storage chamber selected from the one or more gas storage chambers;
wherein the third gas chamber stores a third greenhouse gas separated by the separation complex.

16. The apparatus for capturing and processing exhaust gases according to claim 15,
wherein the first gas chamber feed tube is a pipe;
wherein the first gas chamber feed tube forms a fluidic connection between the separation tank and the first gas chamber of the one or more gas storage chambers;
wherein the second gas chamber feed tube is a pipe;
wherein the second gas chamber feed tube forms a fluidic connection between the separation tank and the second gas chamber of the one or more gas storage chambers;
wherein the third gas chamber feed tube is a pipe;
wherein the third gas chamber feed tube forms a fluidic connection between the separation tank and the third gas chamber of the one or more gas storage chambers.

17. The apparatus for capturing and processing exhaust gases according to claim 16, wherein the first gas chamber feed tube valve is a valve that controls the flow of the separated greenhouse gas from the separation tank into the first gas chamber feed tube;

wherein the second gas chamber feed tube valve is a valve that controls the flow of the separated greenhouse gas from the separation tank into the second gas chamber feed tube;

wherein the third gas chamber feed tube valve is a valve that controls the flow of the separated greenhouse gas from the separation tank into the third gas chamber feed tube.

18. The apparatus for capturing and processing exhaust gases according to claim 17, wherein the first gas chamber intake valve is a valve that controls the flow of the a separated greenhouse gas from the first gas chamber feed tube valve into the first gas chamber intake pump;

wherein the second gas chamber intake valve is a valve that controls the flow of the separated greenhouse gas from the first gas chamber feed tube valve into the second gas chamber intake pump;

wherein the third gas chamber intake valve is a valve that controls the flow of the separated greenhouse gas from the first gas chamber feed tube valve into the third gas chamber intake pump.

19. The apparatus for capturing and processing exhaust gases according to claim 18, wherein the first gas chamber intake pump is a mechanical device that generates a pressure differential which is used for transporting the separated greenhouse gas from the first gas chamber intake valve into the first gas chamber through the first gas chamber feed tube valve;

wherein the second gas chamber intake pump is a mechanical device that generates a pressure differential which is used for transporting the separated greenhouse gas from the second gas chamber intake valve into the second gas chamber through the second gas chamber feed tube valve;

wherein the third gas chamber intake pump is a mechanical device that generates a pressure differential which is used for transporting the separated greenhouse gas from the third gas chamber intake valve into the third gas chamber through the third gas chamber feed tube valve.

\* \* \* \* \*